3,192,105
ALPHA-CHLOROACETOPHENONE COMPOSITIONS, THEIR PREPARATION AND USE
Austin M. Wortley, Jr., Devon, and Barry Rothman, Malvern, Pa., assignors to Penguin Associates, Inc., Malvern, Pa., a corporation of Pennsylvania
No Drawing. Filed Dec. 4, 1962, Ser. No. 242,115
3 Claims. (Cl. 167—47)

This invention relates to mixtures of alpha-chloroacetophenone and colloidal silicas, their preparation, and the use thereof as a lachrymator.

Chloroacetophenone or 2-CN (used herein to designate alpha-chloroacetophenone) is used as a main ingredient in tear-gas devices such as tear-gas bombs, hand grenades, cartridges, etc. Commercial grades of 2-CN are somewhat acid and have a tendency to agglomerate into large lumps in storage, hence in the present state of the art, it is common to mix the 2-CN with diluents such as magnesium hydroxide in order to counteract the acid of the 2-CN and prevent agglomeration. These prior-art mixtures when dispersed in the air by an explosion or other propulsive means, form a large dust cloud of lachrymatory material. The diluents, if alkaline, prevent caking so that the 2-CN can be readily loaded into munitions such as cartridges, hand grenades, etc. Furthermore, alkaline diluents prevent the acid associated with commercial 2-CN from attacking the munition shell which is filled with it. Magnesium hydroxide, magnesium oxide, and diatomaceous earth are commonly used as diluents for 2-CN in the present state of the art.

Although the known alkaline diluents promote the flow of 2-CN, counteract the acid present, and promote the formation of dust dispersions, the mixtures of 2-CN formed with them are all unstable in storage, and they tend to agglomerate after a relatively short period. Hence, after one to three years in storage, munitions such as cartridges and hand grenades, etc., which depend upon a blast dispersion of dust, when loaded with a mixture of 2-CN and any of the known diluents become totally ineffective due to the agglomeration of the 2-CN mixtures.

We have found that 2-CN mixed with colloidal silica is superior to the known mixtures. If the 2-CN is acid, any alkaline colloidal silica can be used, such as Quso F20 or Quso G30, both manufactured by Philadelphia Quartz Co. The degree of alkalinity is unimportant so long as sufficient is used to neutralize the acid in the 2-CN. If the 2-CN is not acid, any colloidal silica such as either of those just mentioned, or Cab-O-Sil, manufactured by the Godfrey L. Cabot Co., or Santogel, a product of Monsanto Chemical Co., can be used. Both colloidal silica and 2-CN irritate the upper respiratory passages, and 2-CN also affects the conjunctiva of the eye. Their action is synergistic, particularly in small particle sizes, producing intense irritation of the upper respiratory passages as well as affecting the conjunctiva of the eye. Furthermore, the mixture is free flowing, non-caking in long-term storage, and it is non-corrosive.

Mixtures containing as little as 3 percent by weight of 2-CN, the balance being colloidal silica, provide a powerful lachrymatory effect. As little as 1 percent of 2-CN is effective. There must be at least 1 percent of colloidal silica in 99 percent of 2-CN to insure a free-flowing mixture which will not cake on storage, and 3 percent of colloidal silica in 97 percent of 2-CN is very effective and has no tendency to agglomerate even in long-term storage at high humidity. Mixtures containing the lower percentage of 2-CN have proved more irritating to the upper respiratory passages because of the higher percentage of colloidal silica. On the other hand, the mixtures containing the higher percentages of 2-CN have proved more lachrymatory because of the higher percentages of 2-CN. The low bulk density, the immense surface area (on the order of 300 square meters per gram), and the small ultimate particle size (preferably on the order of about 1–10 microns of the colloidal silica), have a definite effect upon the lachrymatory power of 2-CN. Colloidal silica dust has a drying effect upon the mucous membrane, and produces mild irritation in the form of coughing and sneezing when inhaled. 2-chloroacetophenone is a powerful irritant, particularly to the upper respiratory passages and the conjunctiva of the human eye. The combination of these two materials has a distinct antagonistic effect upon human beings, producing violent eye irritation, coughing, and sneezing, in concentrations as low as 2 parts per million parts of air. The amount of colloidal silica required to produce this synergistic effect is not large, as little as 3 percent by weight being quite effective, and as little as 1 percent having a noticeable effect. Other preferred mixtures range from approximately 10 percent of colloidal silica to 90 percent of 2-CN for small arms cartridges, to mixtures containing as much as 97 percent colloidal silica for use in blast dispersion grenades and spray-type devices.

The colloidal silica can be effectively mixed with the 2-CN by grinding the materials together in a ball or hammer mill, or the like, or by other means. We have found that a product pulverized or otherwise reduced in size so that at least about 90 percent of the material is in the 1–10 micron range is most effective. The addition of colloidal silica to molten 2-CN, as for example the addition of 50 parts of colloidal silica by weight to 50 parts of molten 2-CN with stirring, on cooling gives a dry free-flowing powdered mixture which need not be further pulverized and may be poured as a powder into a cartridge or other munition. The potency of mixtures of silica and 2-CN increases as the particle size decreases, and particularly as the particle size of the 2-CN decreases. However, simply stirring the two materials together provides a free-flowing and powerfully lachrymatory mixture even with relatively large particles, up to 100 microns or larger in size.

Typical examples of the use of this improved form of 2-CN follow.

Example I

Twenty parts by weight of alkaline colloidal silica is added to 80 parts by weight of raw 2-chlorocetophenone. The rough mixture is placed in a ball mill and ground until 90 percent of the mixture will pass through a 325-mesh screen. The material is then removed from the mill and sifted to remove large particles. This 80/20 mixture is ideally suited for loading into small arm cartridges such as pistol and shot-gun shells. Primed small arm cartridges loaded with a small quantity of gun powder sealed off by a cardboard or plastic wad are placed under a hopper and the free-flowing 80/20 mixture simply metered into the cartridge. The cartridge is then sealed with a plastic or cardboard disc and is ready for use.

Example II

A given amount of 2-CN is dissolved in a suitable solvent, such as benzene, carbon tetrachloride, or acetone. Alkaline colloidal silica, equal in weight to the 2-CN, is added to the solution, making a slurry. The solvent is then driven off from the slurry by vacuum distillation. The remaining dry powder consists of a 50–50 by weight mixture of 2-CN and colloidal silica. The particle size of mixtures produced by this solvent dispersion system is on the order of 1–10 microns. This mixture is well suited for use in blast dispersion grenades, gun-powder actuated and spray-type devices. The powder of 2-CN and silica gel may simply be metered into grenade shells or other cartridges and dispersed by means of explosion or propulsion.

*Example III*

Twenty parts by weight of alkaline colloidal silica is added to 80 parts by weight of raw 2-CN. The mixture is placed in a ball mill and ground until 90 percent of it passes through a 325-mesh screen. The mixture is removed from the ball mill, and sifted to remove large particles. The resulting free-flowing mixture is poured into a hopper and metered amounts are passed from there into the plastic shells of cartridges. The cartridges are sealed off with a cardboard disc.

The cartridges, before being loaded with the mixture, are primed, and supplied with a small quantity of gunpowder, just forward of the primer. The gunpowder is sealed off from the mixture of silica and 2-CN by a cardboard or plastic wad.

*Example IV*

Same as the method of Example III, except that one pound of colloidal silica is added to 99 pounds of 2-CN.

*Example V*

Same as the method defined in Example III, except that 99 pounds of colloidal silica is added to 1 pound of 2-CN.

*Example VI*

Dissolve 50 pounds of 2-CN in 50 pounds of acetone. Stir in 50 pounds of colloidal silica slowly to obtain a slurry. Remove the acetone by vacuum distillation.

The remaining powder after the acetone has been removed consists of a 50–50 mixture by weight of colloidal silica and 2-CN. The important point of this method is that the particle size of the dry powder produced is in the range of 1 to 10 microns, whereas about 325 mesh (44 microns) is about the finest particle size that can be produced by mechanical crushing means. This mixture of 2-CN and colloidal silica, with the particle size of 1 to 10 microns, is well suited for use in blast dispersion grenades, gunpowder actuated, and spray-type devices.

The mixture is placed into a hopper, and metered amounts are passed into grenade shells, for example. Then the fuse mechanism of the grenade is attached to the filled grenade shell.

The invention is covered in the claims which follow. What we claim is:

1. A mixture useful as a lachrymator in cartridges, grenades, and the like, said mixture being in the form of a free-flowing mass of fine particles capable of being poured into a tear gas device in measured quantities and comprising alkaline colloidal silica, 2-CN impregnated in said alkaline colloidal silica to give a mixture thereof, said mixture comprising agglomerates having a particle size substantially in the range of 1 to 10 microns, said mixture being alkaline to counteract the acidity of the 2-CN and thereby inhibit acid attack on said cartridges, grenades, and the like, said alkaline colloidal silica and said 2-CN forming a reaction product during storage because of the acidity of the 2-CN and the alkalinity of said alkaline colloidal silica, said reaction product being such that it does not enlarge the particle size and does not affect the anti-caking properties of said mixture, thus giving said mixture a prolonged shelf life.

2. A method of making a tear gas cartridge and the like, comprising the steps of mixing 50 pounds of alkaline colloidal silica with 50 pounds of 2-CN by dissolving the 2-CN in acetone, stirring the colloidal silica slowly into the solubilized 2-CN to get a slurry solution, removing the acetone to get a dry powder mixture of silica and 2-CN having a particle size substantially in the range of 1 to 10 microns, pouring the mixture into a hopper, passing a metered amount of the mixture from the hopper into the open end of a cartridge having a primer and a quantity of gunpowder positioned in front of the primer, and sealing off the open end of the cartridge so that the silica-2-CN mixture remains in the cartridge, said mixture being alkaline to counteract the acidity of the 2-CN and thereby inhibit acid attack on the cartridge.

3. A method of making a tear gas hand grenade and the like, comprising the steps of mixing 50 pounds of alkaline colloidal silica with 50 pounds of 2-CN by dissolving the 2-CN in acetone, stirring the colloidal silica slowly into the solubilized 2-CN to get a slurry solution, removing the acetone to get a dry powder mixture of silica and 2-CN having a particle size substantially in the range of 1 to 10 microns, pouring the mixture into a hopper, passing a metered amount of the mixture from the hopper into the shell of a hand grenade, and attaching a fuse mechanism to the filled shell, said mixture being alkaline to counteract the acidity of the 2-CN and thereby inhibit acid attack on the shell.

References Cited by the Examiner
UNITED STATES PATENTS

| | | | |
|---|---|---|---|
| 1,842,369 | 1/32 | Lowy | 167—47 |
| 2,165,287 | 7/39 | McBride | 167—47 |
| 2,861,024 | 11/58 | Silver | 167—82 |

OTHER REFERENCES

Handbook of Insecticide Dust Diluents and Carriers (2nd ed.), publ. by Dorland Books, Caldwell, New Jersey, 1955, pages 104–107 relied upon.

BENJAMIN A. BORCHELT, *Primary Examiner.*

SAMUEL FEINBERG, *Examiner.*